United States Patent
Sankaralingam et al.

(10) Patent No.: US 8,201,121 B1
(45) Date of Patent: Jun. 12, 2012

(54) EARLY ESTIMATION OF POWER CONSUMPTION FOR ELECTRONIC CIRCUIT DESIGNS

(75) Inventors: Ranganathan P. Sankaralingam, Fremont, CA (US); Yan Meng, Davis, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 740 days.

(21) Appl. No.: 12/128,602

(22) Filed: May 28, 2008

(51) Int. Cl.
 *G06F 17/50* (2006.01)
(52) U.S. Cl. ............................................. 716/109
(58) Field of Classification Search .................. 716/100, 716/109
See application file for complete search history.

(56) References Cited

U.S. PATENT DOCUMENTS

| | | | | |
|---|---|---|---|---|
| 5,847,966 | A * | 12/1998 | Uchino et al. ................. | 716/109 |
| 6,363,515 | B1 * | 3/2002 | Rajgopal et al. .............. | 716/105 |
| 2003/0088840 | A1 * | 5/2003 | Yonezawa et al. ............. | 716/7 |
| 2004/0019859 | A1 * | 1/2004 | Ravi et al. .................... | 716/4 |
| 2007/0016808 | A1 * | 1/2007 | Bhunia et al. ................. | 713/300 |
| 2007/0146252 | A1 * | 6/2007 | Miller et al. .................. | 345/77 |
| 2007/0244678 | A1 * | 10/2007 | Averill et al. ................. | 703/7 |
| 2008/0071513 | A1 * | 3/2008 | Chickermane et al. ........ | 703/15 |
| 2008/0141185 | A1 * | 6/2008 | Bushnell et al. ............... | 716/2 |
| 2009/0119037 | A1 * | 5/2009 | Khalil et al. .................. | 702/60 |
| 2009/0291642 | A1 * | 11/2009 | Cozzo et al. .................. | 455/67.13 |
| 2011/0099400 | A1 * | 4/2011 | Allen ............................ | 713/322 |
| 2011/0218791 | A1 * | 9/2011 | Lee et al. ...................... | 703/16 |

OTHER PUBLICATIONS

Fiduccia, C.M. and Mattheses, R.M.; "A Linear-Time Heuristic for Improving Network Partitions"; Proceedings of 19th Design Automation Conference (DAC), Published by IEEE, 1982, pp. 175-181.

* cited by examiner

*Primary Examiner* — Suchin Parihar
(74) *Attorney, Agent, or Firm* — Alford Law Group, Inc.; William E. Alford (57) ABSTRACT

In one embodiment of the invention, a method of designing integrated circuits is disclosed. The method includes determining a power correction factor for a subset of partitions of circuits in an integrated circuit design; determining a gross power consumption estimate for all partitions of circuits in the integrated circuit design without synthesizing the entire integrated circuit design; and improving the accuracy of the gross power consumption estimate using the power correction factor to generate a reasonably accurate power consumption estimate for the entire integrated circuit design prior to substantially full circuit synthesis thereof.

23 Claims, 8 Drawing Sheets

EARLY ESTIMATION OF POWER CONSUMPTION FOR ELECTRONIC CIRCUIT DESIGNS

FIELD

The embodiments of the invention relate generally to estimating power consumption of integrated circuit designs.

BACKGROUND

Excessive power consumption or dissipation can destroy an electronic product's commercial viability. For example, an increase in power consumption of one watt can increase an integrated circuit package cost such that it is overly expensive. Moreover, portable electronic devices, such as cellular telephones and laptop computers favor longer battery life.

Power consumption of an integrated circuit can have a direct effect on operating time of portable electronic device between charges. Thus, effectively analyzing power consumption or dissipation of an integrated circuit is beneficial to increase commercial competiveness.

BRIEF SUMMARY

The embodiments of the invention are summarized by the claims that follow below.

DETAILED DESCRIPTION

In the following detailed description of the embodiments of the invention, numerous specific details are set forth in order to provide a thorough understanding of the embodiments of the invention. However, the embodiments of the invention may be practiced without these specific details. In other instances well known methods, procedures, components, and circuits have not been described in detail so as not to unnecessarily obscure aspects of the embodiments of the invention.

Introduction

Power consumption can be determined for an integrated circuit design by stepping through numerous iterations of circuit synthesis, power checks, and rewrites of a register-transfer-level (RTL) source netlist to meet various design constraints. However, this can be a lengthy operation. Any change of an RTL netlist or design constraint (e.g., power, timing, or area design constraint) and the whole process is repeated to determine if a power dissipation design constraint is met. Synthesizing an integrated circuit design may take quite some time (e.g., twelve to twenty-four hours). Waiting for full synthesis of an integrated circuit design to be completed to obtain an accurate power consumption calculation can result in a large turnaround time.

Thus, it may be desirable to estimate the power consumption of an integrated circuit design accurately and quickly in the early design stages, e.g. RTL, with all design constraints being observed before synthesizing the whole integrated circuit design. This may help in reducing the design time of an integrated circuit design.

The embodiments of the invention solve the problem of early power consumption estimation of an integrated circuit design that is represented as a generic netlist (e.g., an RTL netlist generated from RTL source) of generic logic gates. Generic logic gates, while having functional operation information, lack information regarding power consumption. In contrast, the technology library used during circuit synthesis has power characteristics of each standard logic gate cell (also referred to as a mapped logic gate herein) that is to be instantiated into the circuit. Reasonably accurate power calculations can be performed with a netlist that is composed of standard logic gate cells after circuit synthesis is completed. (i.e., post-synthesis netlist). However, it is desirable to obtain a reasonable estimate of power consumption of an integrated circuit before it is completely synthesized. A fast and reasonably accurate method to estimate power consumption of an integrated circuit at the RTL level is disclosed herein.

Generally, inaccuracies in power estimation at the RTL level occur due to differences between what the power estimator expects the synthesis engine to do and what the synthesis engine actually does. For example, the number of standard logic gate cells (mapped logic gates) from a technology library mapped into an integrated circuit during synthesis are typically fewer in number than the number of generic logic gates in the RTL netlist. This is because several generic logic gates usually get collapsed into a single but larger standard cell logic gate (mapped logic gate). However, it is difficult to predict the final number of standard cell logic gates (mapped logic gates) that are instantiated during circuit synthesis.

Additionally power consumption may also be dependent upon the signal activity of each logic gate. In a sequence of logic gates, the power characteristics of a logic gate near the middle of the sequence depends upon the predecessor logic gate. The middle logic gate influences power characteristics of the successor logic gate due to signal propagation through the integrated circuit design. Moreover, a signal may be modified to cause more or less activity depending upon the logic gates through which it propagates. Knowing the signal activity of the integrated circuit, more accurate power estimates may be made of each for generic logic gate, such that the power estimate for each generic logic gate is correlated with its predecessor generic logic gates and its successor generic logic gates.

To quickly obtain a reasonable power estimate for the entire integrated circuit, an accurate but time expensive power estimate may first be made for a small minority of gates to determine an average power correction ratio (also referred to as a power correction factor). Then a simple, fast, and less accurate method of estimating power may be used to generate a gross power consumption estimate for all the generic logic gates in the integrated circuit. The average power correction ratio (aka, power correction factor) obtained with the accurate information may then be used to correct the less-accurate gross power consumption estimate to obtain a reasonably accurate power consumption estimation of the entire integrated circuit design.

To achieve a balance between accuracy and runtime in determining the reasonably accurate power consumption estimate, a portion of the netlist of the integrated circuit design is selected for computing an accurate power consumption estimate. The netlist of the integrated circuit design is partitioned into a plurality of partitions of substantially equally numbered generic logic gates. A sample (e.g., a subset of a plurality of partitions of circuits) of the partitions are selected for synthesis to more accurately calculate their power consumption using mapped logic gates for ratio-ing against power estimates using generic logic gates to generate the average power correction ratio (aka, power correction factor).

For example, fifteen percent (15%) of an integrated circuit design may be selected and synthesized to determine the average power correction ratio. With an accurate estimate of power for a selected portion (e.g., 15% of the logic gates) of the integrated circuit design, the average power correction ratio may be determined to correct less-accurate estimates that may be made for the remaining portion of the integrated circuit design (e.g., 85% of the logic gates). As only a selected portion of the integrated circuit design is synthesized to obtain an early power consumption estimate for the entire integrated circuit chip design, the early power consumption estimate may be obtained sooner in comparison with power consumption estimates that are made after a complete synthesis of the integrated circuit design. Generally with larger integrated circuit designs and more difficult timing constraints that take longer time to fully synthesize, early power consumption estimates may be obtained much sooner than those made after a complete synthesis of the integrated circuit design.

Circuit Synthesis System with Early Power Estimation

Figure 1:
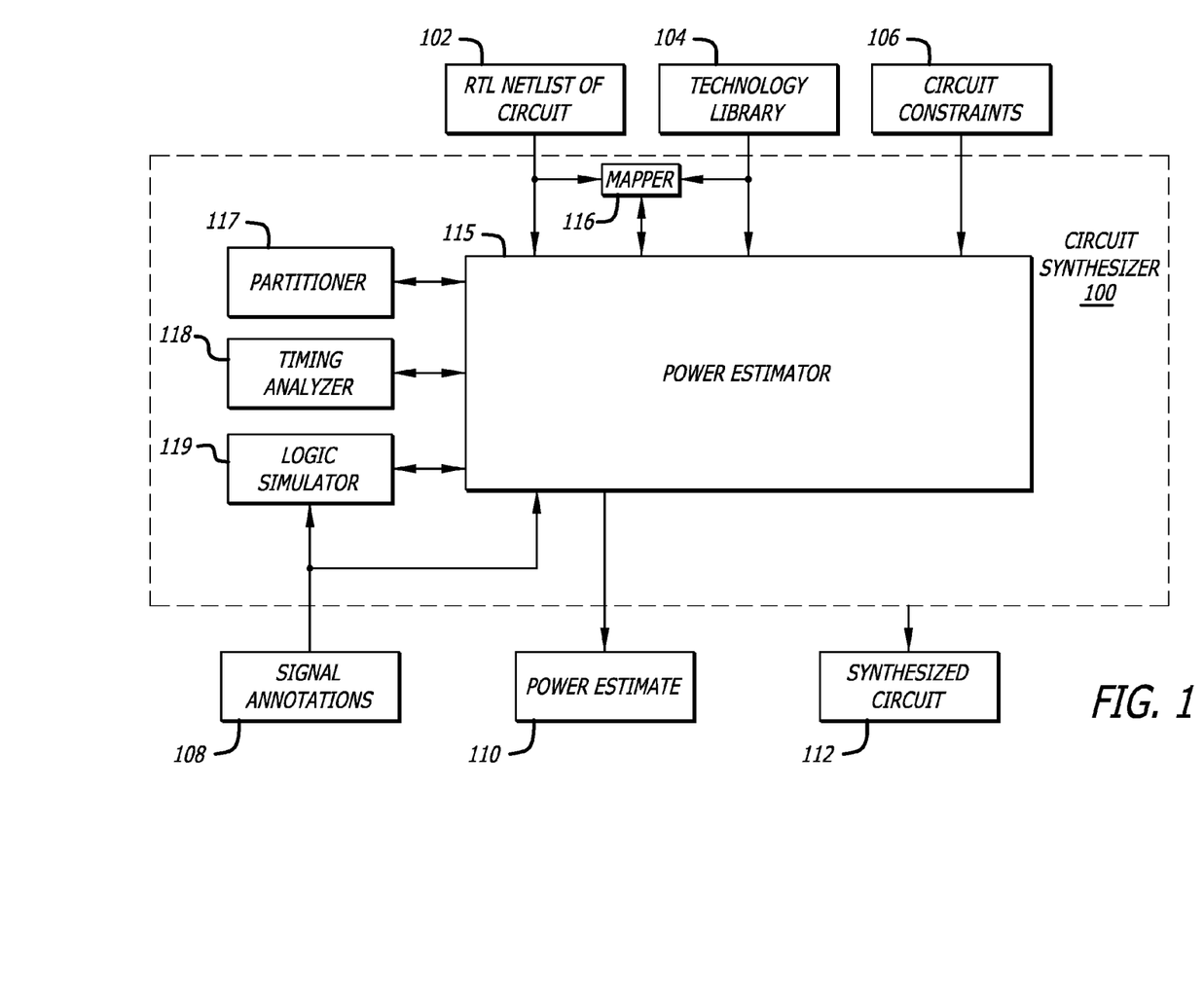
FIG. 1 illustrates a functional block diagram of a circuit synthesizer including an early power estimator.

Referring now to FIG. 1, a circuit synthesis system with a circuit synthesizer 100 executed by a computer is illustrated. The circuit synthesizer 100 may be implemented in a computer programming language, converted to machine code, loaded into a computer, and executed such as by the computer system illustrated in FIG. 6. The circuit synthesizer 100 includes a power estimator 115, a mapper 116, a partitioner 117, a timing analyzer 118, and a logic simulator 119. The power estimator 115 is coupled to the mapper 116, the partitioner 117, the timing analyzer 118, and the logic simulator 119. The power estimator 115 in conjunction with the mapper 116, the partitioner 117, the timing analyzer 118, and the logic simulator 119 perform the algorithms described herein to obtain reasonably accurate early power consumption.

The circuit synthesizer and power estimator receives computer files for an RTL netlist (synthesizable RTL source) of an integrated circuit 102, a technology library 104, and circuit design constraints 106 for the design of the integrated circuit. The RTL netlist is a synthesizable RTL source file that is a high level description of the integrated circuit design. The RTL netlist 102 is a design description listing the generic logic gates and their connectivity that form an integrated circuit.

The partitioner 117 may use various partitioning methods to generate a set of a plurality of partitions with substantially equal numbers of generic logic gates for determining an average power correction ratio. The partitioner 117 may further try to equalize the synchronous circuits, if any, amongst the plurality of partitions in determining the average power correction ratio.

The technology library 104 includes a set of logic circuit cells and their corresponding characterized models for timing, power consumption, geometry, noise, etc. The technology library 104 is used by the circuit synthesizer to map the RTL source description of the integrated circuit design into a physical circuit. The mapper 116 maps the generic logic gates in the RTL netlist 102 into mapped logic gates associated with the technology library 104. The mapper 116 may selectively map a subset of the plurality of partitions being used to determine the average power correction ratio.

If the technology library 104 is a multi-threshold voltage technology (MVT) library, the timing analyzer 118 may be used to identify critical data paths in selected partitions of the integrated circuit design.

The circuit design constraints 106 are the set of rules or restrictions that limit the variability of a design. The circuit design constraints 106 include a power consumption design constraint describing a maximum power consumption for the integrated circuit and timing constraints that describe how fast the final circuit should operate. The power consumption design constraint may be used to determine whether or not the integrated circuit can be synthesized to meet the constrain or whether the high level description of the integrated circuit that was used to generate the source file needs to be altered to meet the power consumption design constraint.

Optionally, the circuit synthesizer 100 may further receive signal annotations 108. The signal annotations 108 describe the toggle activity of the primary input and/or internal signals within the integrated circuit design. The optional signal annotations 108 may be use to assist the logic simulator 119 to propagate signal activities for all internal signals. The signal activity may be used to derive the dynamic power consumption for a generic logic gate.

Upon execution of a command requesting a power estimate for the integrated circuit design, the power estimator 115 receives the input computer files and executes one or more algorithms on the read-in RTL netlist 102 to generate the reasonably accurate early power consumption estimate output 110 for the integrated circuit design and its various levels of hierarchy.

The power estimator 115 operates at the RTL level using generic logic gates to generate a power estimate 110 of an integrated circuit. The power estimator 115 receives an RTL netlist 102 of an integrated circuit, a technology library 104, and circuit constraints 106 associated with a particular integrated circuit design to generate the early power consumption estimate 110. If the early power consumption estimate 110 generated by the power estimator 115 is within the circuit design constraints 106, the RTL netlist of the circuit 102 may then be subsequently synthesized by the circuit synthesizer 100 and a synthesized circuit 112 generated.

Early power consumption estimates generated by the algorithms described herein will vary for different RTL netlists of different integrated circuit designs. Early power consumption estimates generated by the algorithms described herein for a given RTL netlist of an integrated circuit design may also vary if the timing constraints that are included as part of the design constraints 106 vary because timing constraints effect how a circuit is synthesized. By synthesizing a randomly selected few of the partitions to determine an average power correction ratio (also referred to as a power correction factor), the early power consumption estimate for the integrated circuit design may be more accurate. By further considering the signal toggling of the inputs to the generic logic gates and scaling the power consumption of the generic logic gates in response thereto, the early power consumption estimate generated prior to full synthesis of an integrated circuit design may be more accurate still.

Partitioning for Early Power Estimates and Circuit Synthesis

Figure 2A:
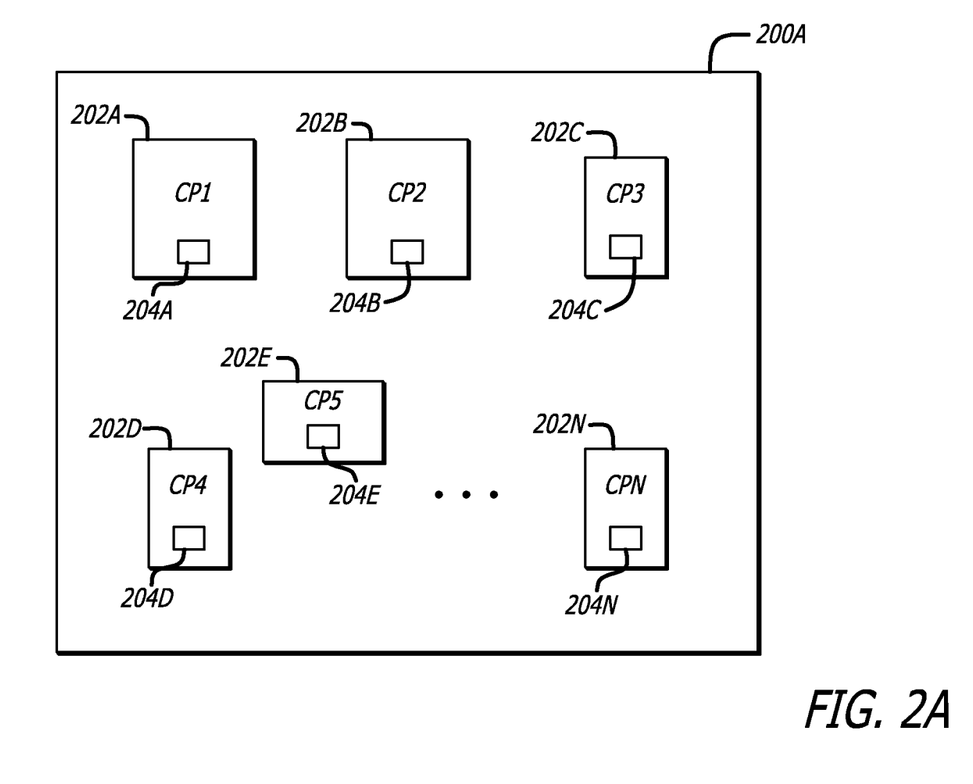
FIG. 2A is a block diagram of an integrated circuit including a plurality of partitions of generic logic gates from which a subset are selected to determine a power correction factor.

Referring now to FIG. 2A, an integrated circuit 200A is illustrated with N-partitions each having K generic logic gates. The predetermined value of K, the number of maxim gates within a partition, sets the number N of the partitions of the circuit 200A. The circuit 200A includes circuit partition 202A-202N. For the purposes of computing power consumption, the circuit 200A may be partitioned using a Fiduccia and Mattheyses (FM) mincut partition algorithm. The FM partition algorithm is described in "A Linear-Time Heuristic for Improving Network Partitions" by C. M. Fiduccia and R. M. Mattheyses published in the Proceedings of ACM/IEEE Design Automation Conference (DAC), 1982, pages 175-181, which is incorporated herein by reference. While the FM partitioning algorithm may be used in one embodiment of the invention, other mincut partitioning algorithms may alternatively be used.

To ensure that power consumption is averaged appropriately over the partitions, synchronous circuits may be equalized or spread out over the N-partitions. This is because synchronous circuits are coupled to clock signals that can cause frequent switching and thus usually consume more power. By equalizing out the number of synchronous circuits in the N-partitions, inappropriate skewing of the power consumption to one or more of the partitions may be avoided. For example, each of the N-partitions 202A-202N illustrated in FIG. 2A, may include a synchronous circuit 204A-204N. Each synchronous circuit 204A-204N may include a register formed by a plurality of parallel D flop flops. The outputs of the flip flops in the integrated circuit may be weighted so that they are equalized over the partitions during the partitioning process of the integrated circuit.

Inaccuracies in power estimation at the RTL level occur due to differences between what the power estimator expects the synthesis engine to do and what the synthesis engine actually does. To better estimate the power consumption for the synthesized circuitry, a number (X) of partitions are selected for analysis and synthesized to determine a power correction ratio (R). The X number of partitions, less than the total number of N-partitions, may be selected in a random or pseudorandom fashion. Synthesizing X partitions takes some time. However, if X is less than N, synthesizing the X partitions, a subset of the N partitions, may be much quicker than synthesizing the entire integrated circuit to obtain an accurate power estimate.

The number X, representing the number of partitions to be selected for analysis—a subset of partitions in the integrated circuit, may be user selectable to adjust the balance between speed and accuracy. The smaller the value of X, the more quickly the power estimate can be made. The larger the value of X, the more accurate the power estimate may be. The value of K, that adjusts the number of partitions N, may also adjust the balance between speed and accuracy.

The partitioning of the integrated circuit to determine power consumption may differ from how the integrated circuit is partitioned for circuit synthesis.

Figure 2B:
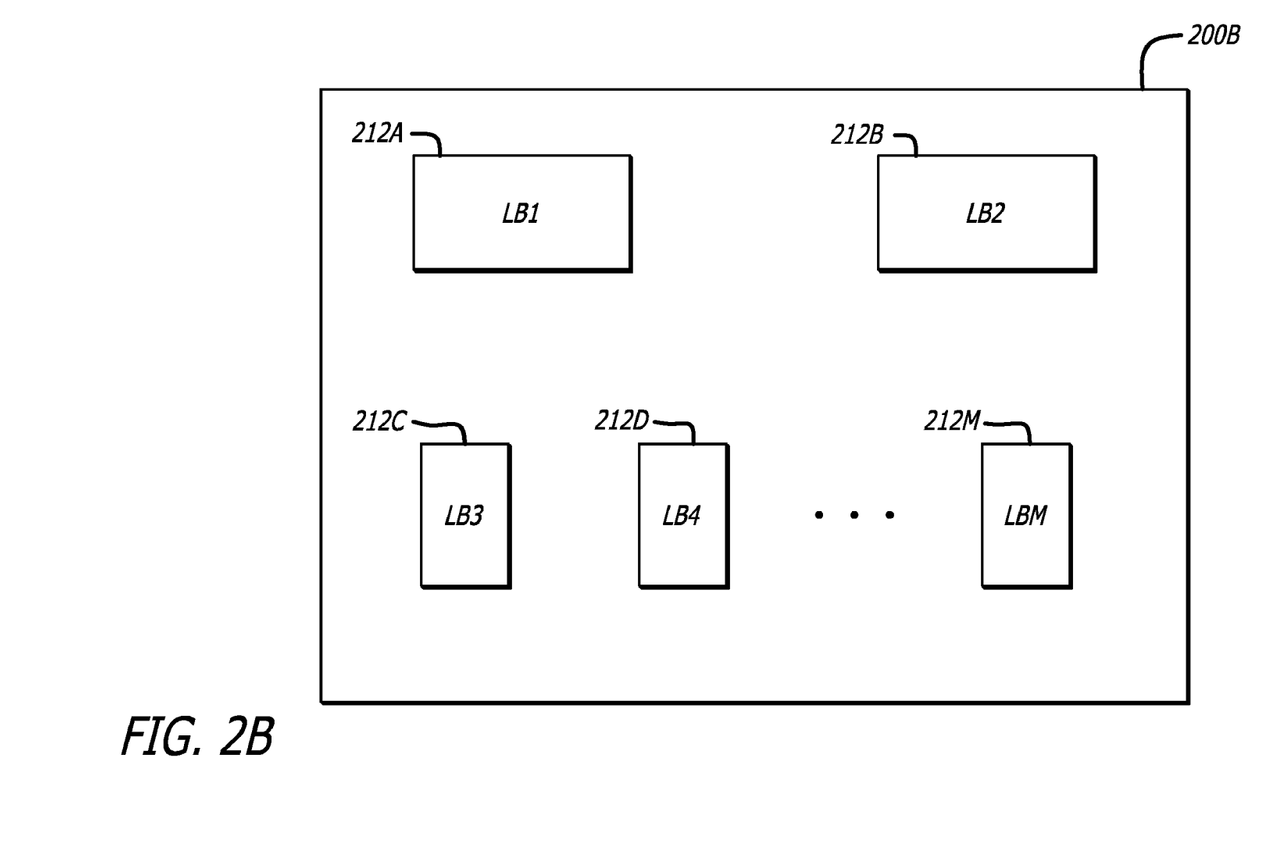
FIG. 2B is a block diagram of the integrated circuit of FIG. 2B partitioned for circuit synthesis.

Referring now to FIG. 2B, the integrated circuit 200B is partitioned by a logical partitioning into M logical blocks (LB1-LBM) 212A-212M. The logical portioning may be performed using a mincut partitioning algorithm. The M logical blocks 212A-212M may or may not correspond to the N-partitions 202A-202N illustrated in FIG. 2. The M logical blocks 212A-212M are not limited to K or fewer logic gates. Moreover, the synchronous circuits may not be equalized over the M logical blocks 212A-212M.

Average Power Correction Ratio

Figure 3:
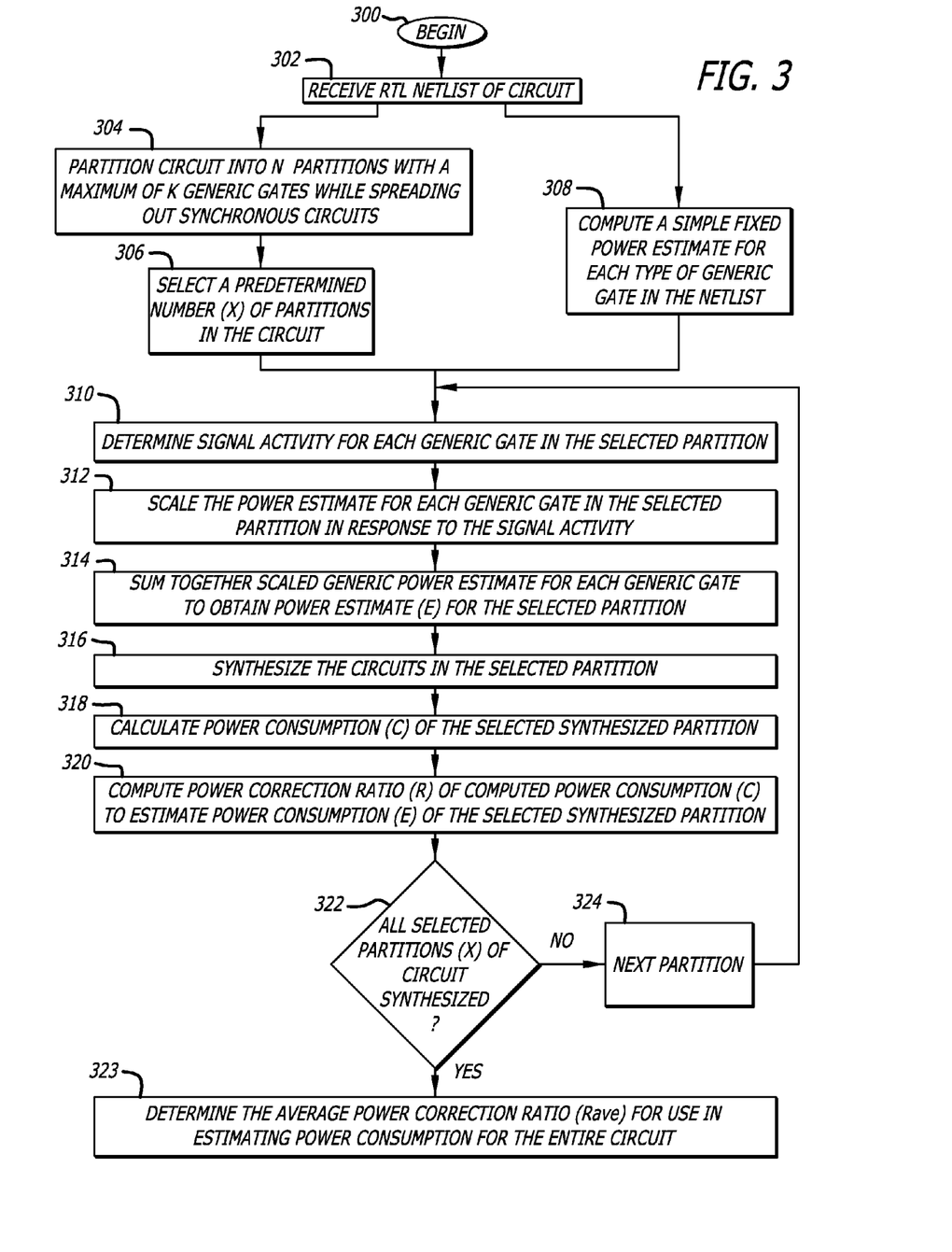
FIG. 3 is a flow chart diagram to determine an average power correction ratio for use in estimating power consumption of an integrated circuit.

Referring now to FIG. 3, a flowchart of an algorithm to determine an average power correction ratio for use in estimating power consumption for an entire integrated circuit is illustrated. The average power correction ratio may also be referred to herein as a power correction factor. The algorithm begins at process block 300 and continuous to block 302.

At process block 302, the RTL netlist of the integrated circuit is received for processing. The method then goes to process blocks 304 and 308 that may be performed in parallel.

At process block 304, the integrated circuit is partitioned into N-partitions having a maximum of K generic logic gates while spreading out the synchronous circuits among the N partitions. In one embodiment of the invention, an FM partition algorithm is used to partition the gates of the integrated circuit into the N-partitions with K or fewer generic logic gates. The synchronous circuits of the integrated circuit are spread out over the N-partitions in order to better average the power consumption of the circuit. The sequential circuits are distributed over the partitions to avoid skewing the power of consumption, computation and obtain better averages. This may be achieved by weighing the output of a D type flip-flop so that the output node is cut during the partitioning and gates coupled to the output node are assigned to a different partition. After partitioning, the process then goes to block 306.

At process block 306, a predetermined number (X) of the N partitions are selected in the circuit for further analysis to determine the average power correction ratio. The X partitions are to be used to determine an average power correction ratio. The selection process may be a pseudorandom selection of partitions from the set of N-partitions in the integrated circuit. The X partitions are a subset of the N-partitions such that the value of X is less than the value of N.

At process block 308, a simple fixed power estimate is computed for each type of generic logic gate in the netlist of the integrated circuit. A simple heuristic is used to determine power consumption for each type of generic logic gate or cell in each of the selected partitions. The heuristic may be as simple as selecting the power consumption of the smallest mapped logic gate corresponding to the generic logic gate type in the technology library.

The power consumption of a mapped logic gate includes static power consumption and dynamic switching power consumption. The static power consumption and dynamic switching power consumption of a mapped logic gate are calculated based on the propagated signal activity and the power characteristic information found in the technology library for the given gate. The power characteristic information from the library includes capacitance, supply voltage, power table, state dependent/independent power, etc. Detailed information of how to use this power characteristic information to calculate the power of the mapped logic gate is defined in the technology library file.

For example, consider an instance of a generic two-input AND gate. The power consumption characteristic for the smallest two-input AND gate is parsed and read from the technology library to be used as the base power consumption for each instance of the generic logic gate, for example. This process is further described with reference to FIG. 5.

With the parallel processing of blocks 304, 306, and block 308 completed, the process then goes to block 310.

At process block 310, signal activity for each input of each generic logic gate in a given selected partition (one of the X partitions) is determined. The process then goes to block 312.

Power consumption of a generic logic gate includes dynamic power consumption that can occur when the generic logic gate is actively switching. Dynamic power consumption can include internal power consumption of a circuit and switching power consumption due to charging and discharging of capacitance loads on a logic gate. Dynamic power consumption information, including internal power consumption and switching power consumption information for mapped logic gates may be parsed from a technology library file and included as a part of the simple power estimate for a generic logic gate. To obtain a more accurate early power estimate, the simple power consumption estimate for a generic logic gate may be scaled to somewhat consider the effects of dynamic power consumption.

At process block 312, in response to the signal activity of each input, the power estimate for each generic logic gate in the given selected partition is scaled in response to a probability and the switching or signal activity of each input to the given generic logic gate. The simple power estimate of the generic logic gate is scaled by the propagated activities at each instance of the generic logic gate. The output of a generic logic gate may not always change or transition from one logic state to another. A signal transition probability may be determined for the likelihood that the output of each instance of each generic logic gate in the given selected partitions will transition. Thus, the simple power consumption estimate of the generic logic is scaled by the signal transition probability and logic transition count for each and every input of a given logic gate derived from propagated signal activity to obtain the power estimate for the generic logic gate. The process then goes to block 314.

At process block 314, the scaled generic power estimate for each generic logic gate is summed together to obtain a power estimate (E) for the given selected partition. The process then goes to block 316.

At process block 316, the circuits in the given selected partition are synthesized by mapping the partition to the technology library. The generic logic gates of the partition are converted into the circuit cells of logic gates that are available in the standard cell library based on the design constraints (e.g., delay, area, power, etc.) of the instances of the original partition. The process then goes to block 318.

At process block 318, a reasonably accurate power consumption (C) is calculated using the given selected synthesized partition. Given that the given selected synthesized partition has its netlist and logic gates mapped to the technology library, the power consumption of partition may be computed. For each given mapped logic gate in the selected synthesized partition, a base power consumption is determined from the technology library. Propagated switching activity of each input signal of each respective mapped logic gate is used to scale the base power consumption of each. The scaled power consumption for all instances of each mapped logic gate are summed together to calculate the computed power consumption (C) of the respective synthesized partition. After calculating the power consumption (C) for the given selected synthesized partition, the process then goes to block 320.

At process block 320, the power correction ratio (R) is determined. The power correction ratio is the ratio of computed power consumption (C) to estimated power consumption (E) of the selected partition. A power correction ratio (R) may be computed for each of the selected X synthesized partitions. Partitions that were not selected are not synthesized and a power correction ratio for them is not computed. The process then moves to block 322.

At process block 322, a determination is made if all the selected partitions X of the circuit are considered and their power ratio computed. If not, the process goes to process block 324 to process the next selected partition and then back to process block 310 to determine the power correction ratio for the remaining selected partitions. If all selected partitions have been considered, then the process goes to block 323.

While process blocks 310-324 have been shown and described as being performed in a serial manner, they may alternatively be performed in parallel for all of the selected partitions (X) such that process blocks 322 and 324 are unnecessary.

At process block 323, a determination of the average power correction ratio ($R_{ave}$) for the integrated circuit is determined. The average power correction ratio ($R_{ave}$) is used to estimate the power consumption for the entire integrated circuit. The average power correction ratio may be a simple average of the sum of the power correction ratios for the selected partitions. That is, the average power correction ratio may be computed by summing the computed power correction ratios and dividing by the value of X.

Note that the design constraints 106 for an integrated circuit design may alter the value of the average power correction ratio ($R_{ave}$). For example, different timing constraints alter how the partitions may be synthesized and can increase or decrease the power consumption therein as well as the average power correction ratio ($R_{ave}$) for an integrated circuit design.

Power Consumption Estimates for ICs Prior to Full Synthesis

The prior description culminated in the computation of the average power correction ratio ($R_{ave}$) for a given integrated circuit design. How the average power correction ratio ($R_{ave}$) is used is now described. A given integrated circuit design may be flattened in hierarchy with power consumption being determined with the flattened hierarchy. Alternatively, the power consumption may be determined with the hierarchy of partitions of logical blocks.

Figure 4A:
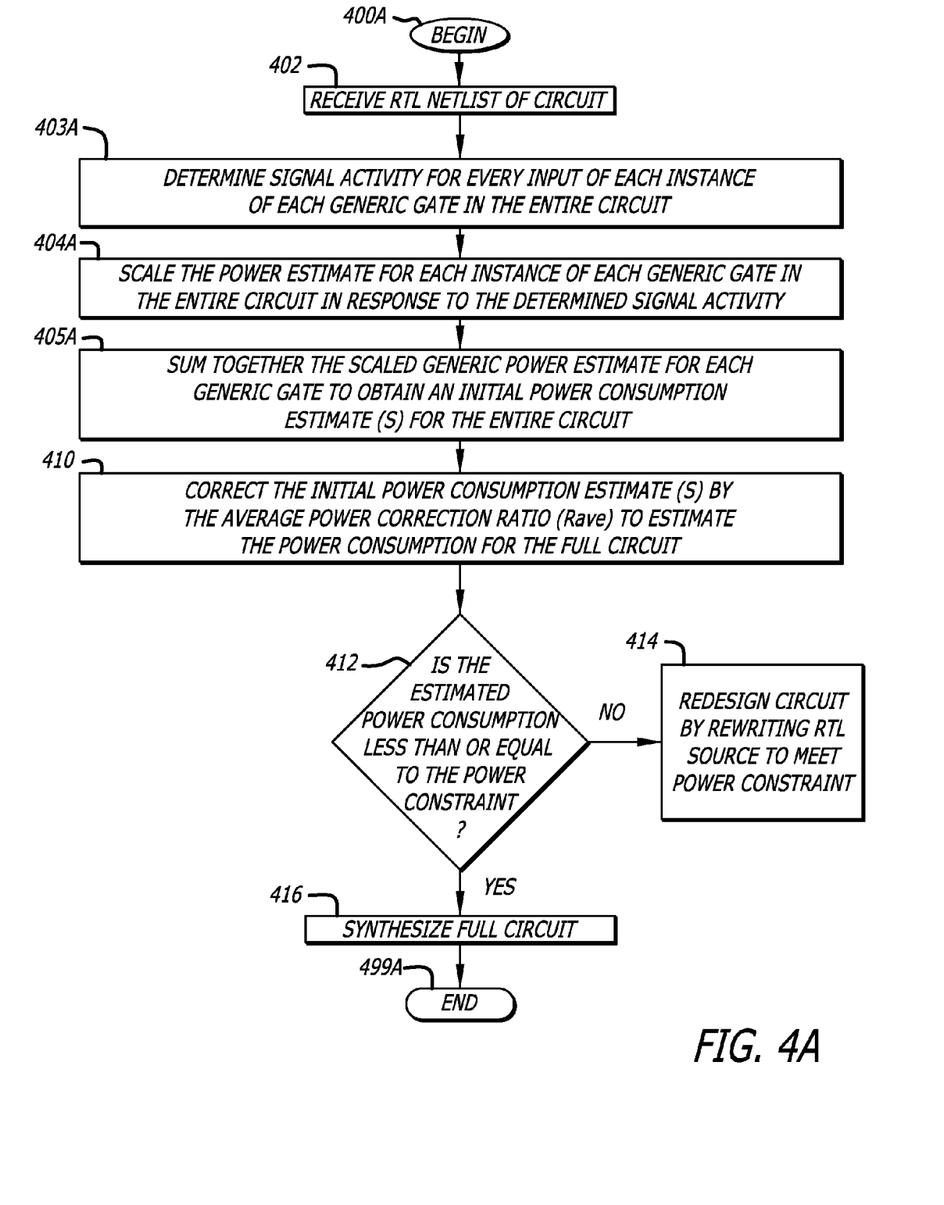
FIG. 4A is a first flow chart diagram to compute the estimated power consumption of an integrated circuit using the average power correction ratio.

Referring now to FIG. 4A, assuming a flattened hierarchy, the power consumption for the full circuit is estimated without having to synthesize the entire integrated circuit so that the design of the integrated circuit maybe reiterated if power constraints are not met. The process begins at process block 400A and jumps to block 402.

At process block 402, the RTL netlist of the integrated circuit is read once again to parse the functional block partitions and each of the generic logic gates instantiated in the netlist of the integrated circuit. The process then goes to block 403A.

At process block 403A, the signal activity for every input of each instance of each generic logic gate in the entire integrated is determined. A function simulation of the overall integrated circuit is performed using a logic simulator 119 to determine the signal activity. The process then goes to block 404A.

At process block 404A, the generic power estimates for each generic logic gate instantiated into the integrated circuit are scaled in response to determined signal activity at each input to each generic logic gate. The process then goes to block 405A.

At process block 405A, the scaled generic power estimates for each generic logic gate are summed together in order to obtain an initial power consumption estimate (S) for the entire circuit. The process then goes to block 410.

At process block 410, the initial power consumption estimate (S) is corrected by the average power correction ratio ($R_{ave}$) to more accurately estimate the power consumption 110 of the entire integrated circuit, without fully synthesizing the integrated circuit. Time and computing resources are conserved by obtaining a more accurate power consumption estimate without having to completely synthesize the integrated circuit. The estimated power consumption 110 may be output to a display device to a user for comparison with the power consumption design constraint and a manual decision of whether or not to synthesize the integrated circuit. Alternatively, the comparison of the estimated power consumption 110 with the design constraint may be automated using software computations, in which case, the process then goes to block 412.

At process block 412, a determination is made if the estimated power consumption is less than or equal to the power consumption design constraint for the entire integrated circuit. If the power consumption design constraint is met (estimated power consumption is less than or equal to the power consumption design constraint), the process goes to block 416. If the power consumption design constraint is not met (estimated power consumption is greater than the power consumption design constraint), the process goes to block 414.

At process block 414, with the power consumption design constraint not being met, a user redesigns the integrated circuit by rewriting the RTL source code, the high level description of the integrated circuit, to try to meet the power consumption design constraint. Alternatively, the power consumption design constraint may be relaxed somewhat if possible to see if process may proceed to synthesis of the full integrated circuit with the relaxed power consumption design constraint.

At process block 416, with the power consumption design constraint being met, the integrated circuit may be fully synthesized by substantially mapping each instance of each generic logic gate in each partition into a circuit logic cell of the given technology library. Upon completion of the synthesis, the process goes to block 499A and ends.

Figure 4B:
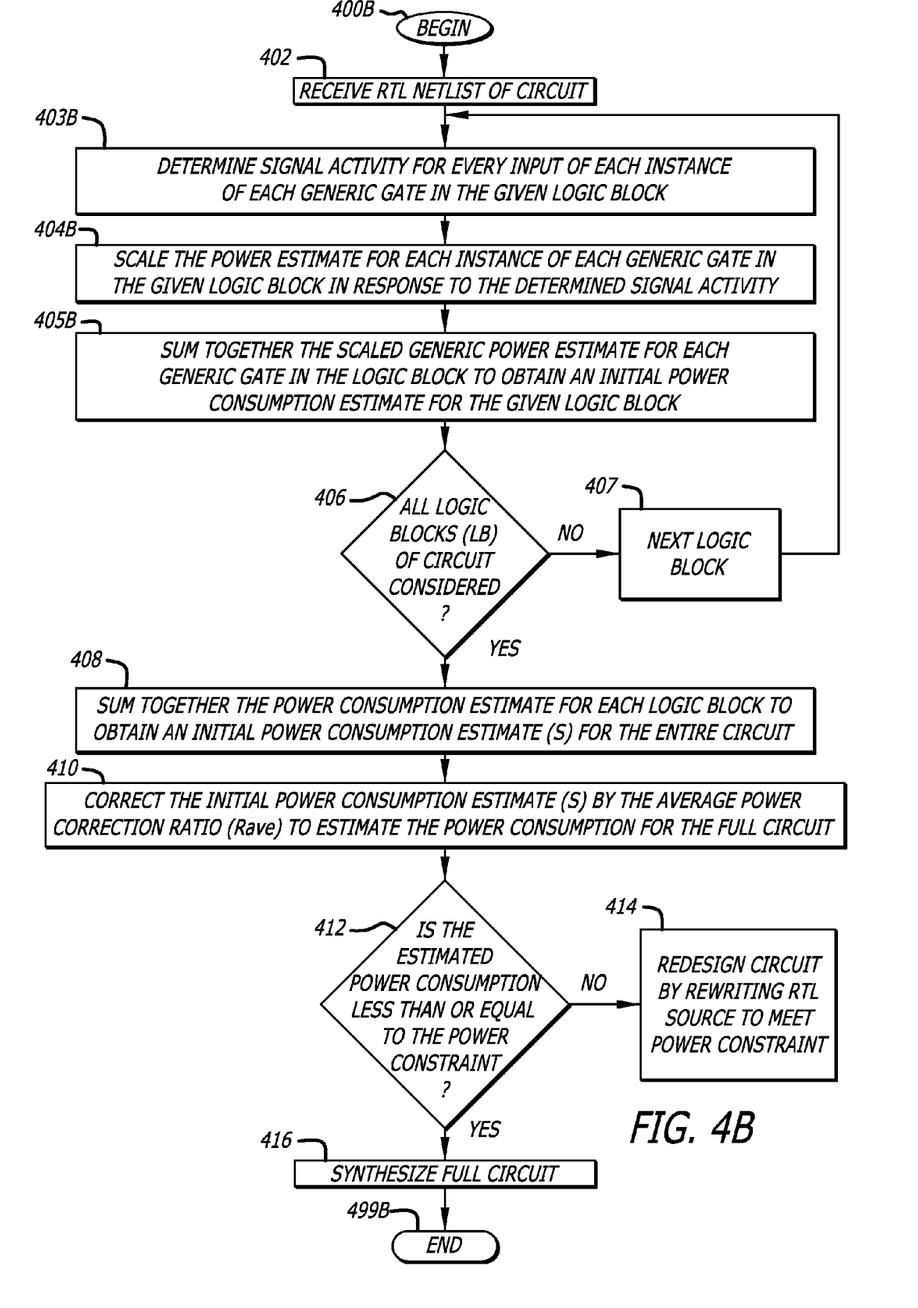
FIG. 4B is a second flow chart diagram to compute the estimated power consumption of an integrated circuit using the average power correction ratio.

Referring now to FIG. 4B, assuming a hierarchy of partitioned logical blocks, the power consumption for the full circuit is determined in accordance with another aspect of the invention. The process begins at process block 400B and jumps to block 402.

At process block 402, the RTL netlist of the integrated circuit is read once again to parse the functional block partitions and each of the generic logic gates instantiated in the netlist of the integrated circuit. The process then goes to block 403B.

At process block 403B, the signal activity for every input of each instance of each generic logic gate in a given logic block is determined. A functional simulation of the given logic block is performed using a logic simulator 119 to determine the signal activity. The process then goes to block 404B.

At process block 404B, the generic power estimates for each generic logic gate instantiated into the given logic block are scaled in response to determined signal activity at each input to each generic logic gate. The process then goes to block 405B.

At process block 405B, the scaled generic power estimates for each generic logic gate in the given logic block are summed together in order to obtain a power consumption estimate for the given logic block. The process then goes to block 406.

At process block 406, a determination is made if all of the logic blocks of the circuit have been considered such that their respective power consumption estimates are known. If all have been considered, the process goes to process block 408. If not all logic blocks in the circuit have been considered, the process goes to process block 407 where the next logic block in the circuit is selected and then back to block 403B so that a power consumption estimate may be determined for the remaining logic blocks.

While process blocks 403B-405B have been shown and described as being performed in a serial manner, they may alternatively be performed in parallel for all logic blocks in the integrated circuit such that process blocks 406 and 407 are unnecessary.

At process block 408, the power estimates for each logic block in the circuit are summed together in order to obtain a power consumption estimate (S) for the entire circuit. The process then goes to block 410.

At process block 410, the initial power consumption estimate (S) is corrected by the average power correction ratio ($R_{ave}$) to more accurately estimate the power consumption 110 of the entire integrated circuit, without fully synthesizing the integrated circuit. Time and computing resources are conserved by obtaining a more accurate power consumption estimate without having to completely synthesize the integrated circuit. The estimated power consumption 110 may be output to a display device to a user for comparison with the power consumption design constraint and a manual decision of whether or not to synthesize the integrated circuit. Alternatively, the comparison of the estimated power consumption 110 with the design constraint may be automated using software computations, in which case, the process then goes to block 412.

At process block 412, a determination is made if the estimated power consumption is less than or equal to the power consumption design constraint for the entire integrated circuit. If the power consumption design constraint is met (estimated power consumption is less than or equal to the power consumption design constraint), the process goes to block 416. If the power consumption design constraint is not met (estimated power consumption is greater than the power consumption design constraint), the process goes to block 414.

At process block 414, with the power consumption design constraint not being met, a user redesigns the integrated circuit by rewriting the RTL source code, the high level description of the integrated circuit, to try to meet the power consumption design constraint. Alternatively, the power consumption design constraint may be relaxed somewhat if possible to see if process may proceed to synthesis of the full integrated circuit with the relaxed power consumption design constraint.

At process block 416, with the power consumption design constraint being met, the integrated circuit may be fully synthesized by substantially mapping each instance of each generic logic gate in each partition into a circuit logic cell of the given technology library. Upon completion of the synthesis, the process goes to block 499B and ends.

Generic Power Consumption Estimates for Generic Logic Gates

At process block 308 of FIG. 3, a simple fixed power estimate for each type of generic logic gate (e.g., AND, NAND, OR, NOR, etc.) in the netlist of the integrated circuit was computed. The simple fixed power estimate for each type of generic logic gate may be computed in a number of ways. An exemplary method of computing a simple fixed power estimate for each type of generic logic gate is now described.

Figure 5:
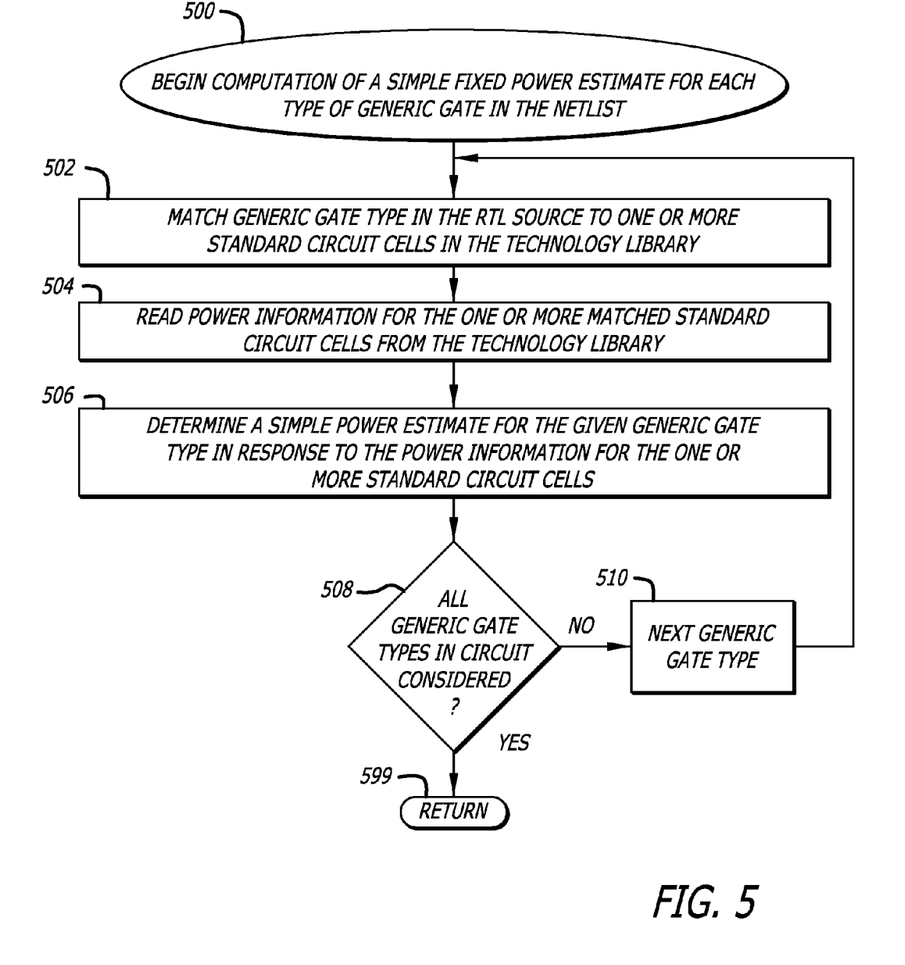
FIG. 5 is a flow chart diagram to determine power estimates for generic logic gates in the netlist of the integrated circuit.

Referring now to FIG. 5, a flow chart of computing an exemplary simple fixed power estimate for each type of generic logic gate in the netlist is illustrated. The process starts at process block 500 and then goes to process block 502.

At process block 502, the generic logic gate types in the RTL source are matched to one or more standard circuit cells in the technology library. For example, a two input NAND gate may map into three different two input NAND standard circuit cells within the technology library. Each of the three different NAND standard circuit cells in the technology library may be sized differently to drive different capacitance loads and therefore have different base levels of power consumption. The process then goes to block 504.

At process block 504, power consumption information for the one or more matched standard circuit cells are parsed from the technology library for the given generic logic gate type. The processing then goes to block 506.

At process block 506, a simple power consumption estimate for the given generic logic gate type is determined in response to the power information acquired from technology library for the one or more standard circuit cells (aka, mapped logic gates). The simple power consumption estimate for the given generic logic gate type may be determined in a number of ways. The technology library includes power consumption information, including dynamic power consumption (e.g., internal power consumption, switching power consumption) and static power consumption (e.g., leakage power consumption), for the one or more mapped logic gates. The format and type of power consumption information in the technology library may vary as the library vendors differ. The power information may be available in one or more single and/or one or more multi-dimensional look up tables (LUT); or by way of scalable polynomial equations that model the power consumption of the mapped logic gate. The mapped logic gate may be characterized to generate the power consumption information contained within the technology library for each respective mapped logic gate.

A generic logic gate may be mapped into a plurality of mapped logic gates from a technology library. In one embodiment of the invention, one of the parsed power consumption information levels from the characterization information for one of the one or more standard circuit cells is selected as the simple or base power consumption estimate for the generic logic gate. For example, the lowest level of power consumption information of the one or more standard circuit cells is selected as the base power consumption for the generic logic gate in one embodiment of the invention. Alternatively, the highest level of power consumption information of the one or more standard circuit cells may be selected as the simple base power consumption for the generic logic gate. In another embodiment of the invention, the power consumption levels from the characterization information for one of the one or more standard circuit cells is averaged to determine a base power consumption level for the given generic logic gate. For example, there may be three standard circuit cells that can be mapped into the generic logic gate with 1, 2, and 3 nano-watts (nw) of base power consumption. To determine the average power consumption level (2 nw), the power consumption levels (1+2+3=6 nw) are summed together and divided by the number considered (3). After determining a simple power consumption estimate for the given generic logic gate, the process may then goes to block 508.

At process block 508, a determination is made if all generic logic gate types in the integrated circuit have been considered. If not, the process goes to block 510 so that the next generic logic gate type is selected and then back to block 502 to repeat the computation of a simple power estimate for the next generic logic gate type. If all generic logic gate types have been considered that are instantiated in the netlist, the process goes to block 599 and ends.

While process blocks 502-506 have been shown and described as being performed in a serial manner, they may alternatively be performed in parallel for all generic logic gate types in the integrated circuit such that process blocks 508 and 510 are unnecessary.

Multi-Value Threshold Library & Power Consumption Estimate

The methods described previously provide a baseline for estimating the power consumption of a generic netlist of an integrated circuit design. A generic netlist may optionally be mapped into a library of logic circuit cells having multi-threshold voltage cells (MVT) in order to reduce static power consumption in an integrated circuit design.

An MVT library is commonly recognized as a set of libraries, library A (LA) and library B (LB), for example. Library A has a plurality of circuit cells CA each having a copy of a circuit cell B (CB) associated with library B. The corresponding circuit cells CA and CB each achieve the same logic functionality. However, the corresponding circuit cells CA and CB have different threshold characteristics for their respective P-channel field effect transistors (PFET) and N-channel field effect transistors (NFET) such that there are different power and delay characteristics for each cell. For example, the circuit cells CA may be the low threshold cells having low threshold voltages for its PFETs and NFETs and the circuits cells CB may be high threshold cells having higher threshold voltages for its PFETs and NFETs. Generally, PFET/NFET transistors with lower threshold voltages may turn on sooner so they may provide lower delay times while PFET/NFET transistors with higher threshold voltages may have lower static power consumption. Thus, comparing a low threshold cell with a high threshold cell, the high threshold cell has a longer delay time but less static power consumption.

The methods described herein may be slightly altered in order to determine a power consumption estimate for an integrated circuit design with and without an MVT cell library prior to full synthesis thereof. With this information, a user can decide whether or not to use a library with MVT cells to reduce power consumption. That is, before synthesizing a circuit with an MVT library, its impact on reducing power consumption of the final netlist can be estimated early to decide whether or not to employ MVT in synthesizing the integrated circuit design. This avoids applying the MVT library and fully synthesizing the integrated circuit, which may take a significant length of time, to determine if the MVT library sufficiently reduces power consumption to meet a power consumption design constraint. If the full circuit synthesis with the MVT library does not meet the power consumption design constraint, a user has to back track and rewrite the source RLT netlist to reduce power consumption.

To determine a power consumption estimate for an integrated circuit design prior to full synthesis thereof in response to using an MVT library, the method of determining the average power correction ratio (Rave) illustrated by FIG. 3 may be slightly altered. In this method, the accurate power consumption analysis is altered by synthesizing the selected subset of partitions with the MVT library.

Prior to synthesizing the circuits in any selected partitions of the integrated circuit design, the potential critical paths in the partition are identified in response to the timing constraints specified by the user. The one or more potential critical data paths may include generic logic gates found within one or more of the selected partitions X of the integrated circuit.

With an MVT library, the generic logic gates in the critical data paths are synthesized differently than the generic logic gates that are in non-critical data paths. The generic logic gates in the critical paths are synthesized using the low threshold circuit cells to provide smaller timing delays in the critical path and improve the timing performance of the integrated circuit. The generic logic gates in the non-critical data paths are synthesized using the high threshold circuit cells to reduce static power consumption of the gates and lower overall power consumption in the integrated circuit.

Thus, at process block 316, if a generic logic gate in the selected partition is in the critical data path it is synthesized using the faster low threshold circuit cell. Otherwise, if a generic logic gate in the selected partition is not in a critical data path, it is synthesized using the slower high threshold circuit cell that has lower static power consumption. The calculated power consumption (C) of the selected synthesized partition is then determined by process block 318 using the power consumption characteristics associated with the MVT library and the mapped circuit cells from the library.

Thus, the power correction ratio (R) and the average power correction ratio (Rave) is influenced by using the MVT library for synthesis of the selected X partitions in the integrated circuit. The average power correction ratio (Rave) responsive to the MVT library is then used in process block 410 illustrated in FIG. 4 to determine estimated power consumption for the full integrated circuit.

Computer System for Early Power Estimation and Circuit Synthesis

Figure 6:
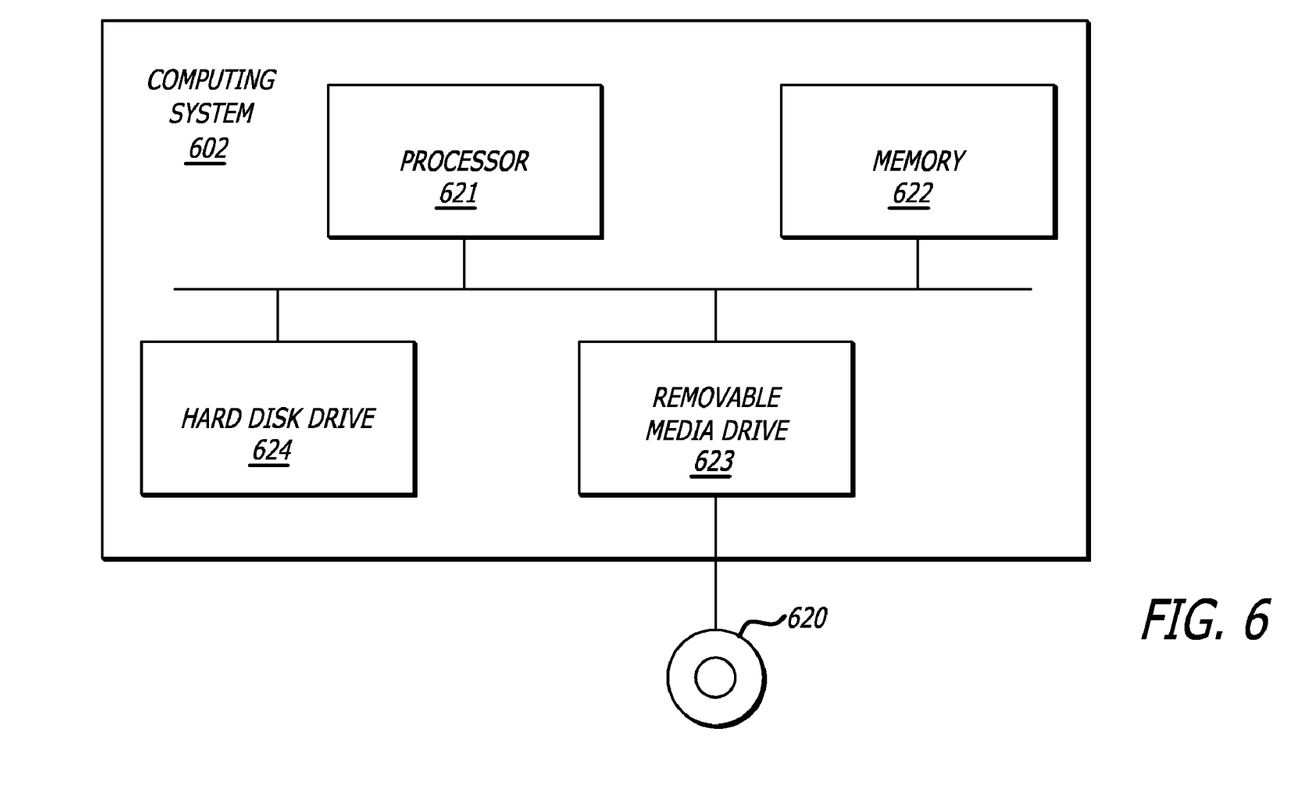
FIG. 6 is a functional block diagram of a computing system that may be used to make computations to determine power estimates for generic logic gates in the netlist of an integrated circuit, to determine an average power correction ratio for the integrated circuit, and to estimate power consumption of the integrated circuit.

Referring now to FIG. 6, a computing system 600 is illustrated that may be used to perform some or all of the processes in accordance with a number of embodiments of the invention. In one embodiment of the invention, the computing system 600 includes a processor 610, a memory 620, a removable media drive 630, and a hard disk drive 640. In one embodiment, the processor 610 executes instructions residing on a machine-readable medium, such as the hard disk drive 640, a removable medium 601 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 620, which may include Random Access Memory (RAM), dynamic RAM (DRAM), etc. The processor 610 may retrieve the instructions from the memory 620 and execute the instructions to perform the operations described above.

Note that any or all of the components and the associated hardware illustrated in FIG. 6 may be used in various embodiments of the system 600. However, it should be appreciated that other configurations of the system 600 may include more or less devices than those shown in FIG. 6.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for performing the operations described herein. This apparatus may be specially constructed for the required purposes, or it may comprise a general-purpose computer selectively activated or reconfigured by a computer program stored in the computer. When implemented as a computer program in software, the elements of the embodiments of the invention are essentially the code segments to perform the processes. The algorithm processes may be written in a computer programming language and then converted to machine code segments, loaded into a computer, and then executed to perform the processes in an automated fashion. The program or code segments can be stored in a processor, computer, or machine readable medium. The code segments may also be downloaded via computer networks such as the Internet, Intranet, etc and stored in the processor, computer, or machine readable medium.

The processor, computer or machine readable medium may include any mechanism for storing or transmitting information in a form readable by a machine (e.g., a processor or computer). For example, machine-readable medium includes semiconductor storage media, magnetic disk storage media; optical storage media, or any type of media suitable for storing electronic instructions that may be coupled to a machine or a computer; such as, but not limited to, any type of disk including floppy disks, optical disks, CD-ROMs, magnetic-optical disks, read-only memories (ROMs), random access memories (RAMs), flash memory devices, EPROMs, EEPROMs, magnetic or optical cards. The computer program code may be transmitted via electrical, optical, acoustical or other form of propagated signals (e.g., carrier waves, infrared signals, digital signals, etc.) for storage into a computer or machine readable medium.

The processes presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description herein. Additionally, the embodiments of the invention are not described with reference to any particular programming language. It will be appreciated that a variety of programming languages may be used to implement the teachings of the invention as described herein.

CONCLUSION

The embodiments of the invention provide a generalized method of obtaining early power estimates for an integrated circuit design, obviating the need for tuning to handle design characteristics. The fundamental properties of mapping, power analysis, randomization, and statistical sampling are exploited to achieve reasonably accurate power estimates without resorting to clever tricks to account for each synthesis optimization effecting power estimates.

The embodiments of the invention randomly sample and synthesize partitions in an integrated circuit to more accurately predict power consumption of an integrated circuit. The embodiments of the invention employ a partitioning algorithm to create approximately evenly-sized partitions from the original circuit. The embodiments of the invention perform synthesis of the randomly sampled partitions to more accurately predict the power consumption of the partitions instead of using a heuristic analysis. The embodiments of the invention use a highly accurate power estimate for a fraction of an integrated circuit to correct a low accurate power estimate of the entire integrated circuit to more quickly obtain a power consumption estimate of the integrated circuit.

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. For example, the power estimating methods described herein may be used to estimate the power consumption of a mapped netlist without running power calculation on the full design. Power calculations are performed on a portion of the mapped netlist that is then scaled up to determine estimated power consumption for the full design. Instead, the embodiments of the invention should be construed according to the claims that follow below.

What is claimed is:

1. A method of designing integrated circuits, the method comprising:
   determining a power correction factor for a subset of partitions of circuits in an integrated circuit design;
   determining a gross power consumption estimate for all partitions of circuits in the integrated circuit design without synthesizing the entire integrated circuit design; and
   improving the accuracy of the gross power consumption estimate using the power correction factor to generate a reasonably accurate power consumption estimate for the entire integrated circuit design prior to substantially full circuit synthesis thereof; and
   wherein one or more of the determining of the power correction factor, determining of the gross power consumption estimate, and the improving of the accuracy of the gross power consumption estimate using the power correction factor are performed with a processor.

2. The method of claim 1, wherein
   the power correction factor is determined by averaging power correction ratios for each of the subset of partitions.

3. The method of claim 2, wherein
   each power correction ratio for each respective partition of the subset is a quotient of a sum of computed power consumptions for mapped logic gates divided by a sum of estimated power consumptions for generic logic gates in the respective partition.

4. The method of claim 1, further comprising:
   partitioning the integrated circuit design into a plurality of partitions of circuits;
   equalizing a number of synchronous circuits in the integrated circuit design into the plurality of partitions of circuits; and
   selecting the subset of partitions of circuits from the plurality of partitions of circuits in the integrated circuit design.

5. The method of claim 4, wherein
   the determining of the power correction factor for the integrated circuit design includes
      estimating power consumption of generic logic gates in the subset of partitions of circuits; and
      computing power consumption of mapped logic gates in the subset of partitions of circuits.

6. The method of claim 5, wherein
   the estimating of the power consumption of generic logic gates includes
      computing a simple fixed power estimate for each type of generic logic gate in the netlist,
      determining signal activity for one or more inputs of each generic logic gate in each respective partition;
      scaling the simple fixed power estimate of each generic logic gate in response to the signal activity for the one or more inputs of the respective generic logic gate; and
      summing together the scaled power estimate of each generic logic gate in each respective partition.

7. The method of claim 6, wherein
   the computing of the power consumption of mapped logic gates includes
      synthesizing each generic logic gate in each respective partition of the subset of partitions into a mapped logic gate of a plurality of mapped logic gates in a technology library,
      reading the power consumption characteristic associated with each mapped logic gate from the technology library to determine the power consumption for each mapped logic gate in each respective partition of the subset of partitions, and
      summing together the power consumption for each mapped logic gate in each respective partition of the subset of partitions.

8. The method of claim 6, wherein
   the scaling of the simple fixed power estimate of each generic logic gate is further responsive to a respective switching probability and the method further includes
      determining the respective switching probability that an output for each respective generic logic gate switches in response to the signal activity of the respective one or more inputs.

9. A method of designing integrated circuits, the method comprising:
   determining an average power correction ratio to estimate power consumption for an integrated circuit design;
   determining input signal activity for substantially every input of each generic logic gate in the integrated circuit design;
   scaling the gate power consumption of each generic logic gate in response to the input signal activity;
   summing together the scaled gate power consumption of each generic logic gate in the integrated circuit design to obtain an initial power consumption estimate for the integrated circuit design; and
   correcting the initial power consumption estimate by the average power correction ratio to generate a reasonably accurate power consumption estimate of the integrated circuit design without a full synthesis thereof; and
   wherein one or more of the determining of the average power correction factor, the determining of the input signal activity, the scaling of the gate power consumption, the summing together, and the correcting the initial power consumption estimate are automatically performed with a processor.

10. The method of claim 9, further comprising:
determining if the reasonably accurate power consumption estimate of the integrated circuit design is less than or equal to power consumption design constraint, and
if the reasonably accurate power consumption estimate of the integrated circuit design is less than or equal to the power consumption design constraint,
then synthesizing the entire integrated circuit design.

11. The method of claim 10, further comprising:
if the reasonably accurate power consumption estimate of the integrated circuit design is greater than the power consumption design constraint,
then redesigning the integrated circuit design to meet the power consumption design constraint.

12. The method of claim 9, wherein
the determining of the average power correction ratio includes
receiving a register transfer level (RTL) netlist of the integrated circuit design;
computing a simple fixed power consumption estimate for each type of generic logic gate in the RTL netlist;
partitioning the integrated circuit design into N partitions with a maximum of K generic logic gates and spreading out synchronous generic logic gates amongst the N partitions, wherein K is a predetermined number and N is a variable responsive to a value of K;
selecting X partitions to accurately analyze for power consumption, wherein X is a predetermined whole number less than N;
determining input signal activity for each generic logic gate in the X selected partitions;
scaling the simple fixed power consumption estimate for each generic logic gate in the X selected partitions in response to the respective input signal activity; and
summing together the scaled fixed power consumption estimate for each generic logic gate in the X selected partitions to determine an estimated power consumption for each of the X selected partitions.

13. The method of claim 12, wherein
the determining of the average power correction ratio further includes
synthesizing each of the X selected partitions;
calculating a synthesized power consumption for each of the X selected partitions; and
calculating a power correction ratio for each of the X selected partitions by dividing the synthesized power consumption by the estimated power consumption for each of the respective X selected partitions.

14. The method of claim 13, wherein
the determining of the average power correction ratio further includes
summing together the power correction ratio of each of the X selected partitions, and
dividing the summed power correction rations by the value of X.

15. The method of claim 14, wherein
the determining of the average power correction ratio further includes
identifying one or more critical data paths in the X selected partitions to determine critical generic logic gates in one or more potential critical data paths amongst non-critical generic logic gates in one or more non-critical data paths; and
reading low gate threshold voltage power consumption information from the technology library for the critical generic logic gates and high gate threshold voltage power consumption information from the technology library for the non-critical generic logic gates in each of the X selected partitions.

16. The method of claim 12, wherein
the computing of the simple fixed power consumption estimate for each type of generic logic gate in the RTL netlist includes
reading power characterization information from a technology library for a plurality of mapped logic gates corresponding to the type of generic logic gate, and
selecting the smallest power consumption value of the plurality of mapped logic gates as the simple fixed power estimate.

17. The method of claim 12, wherein
the computing of the simple fixed power consumption estimate for each type of generic logic gate in the RTL netlist includes
reading power characterization information from the technology library for a plurality of mapped logic gates corresponding to the type of generic logic gate, and
averaging the power characterization information for the plurality of mapped logic gates to determine the simple fixed power consumption estimate.

18. The method of claim 9, wherein
the determining of the input signal activity for substantially every input of each generic logic gate in the integrated circuit design includes
simulating the logic functionality of the generic logic gates in the integrated circuit design.

19. The method of claim 12, wherein
the X selected partitions are pseudo randomly selected from the N partitions of the integrated circuit design.

20. A circuit synthesis system for designing integrated circuits, the system comprising:
a partitioner to partition generic logic gates of an integrated circuit design into a plurality of partitions each having a substantially equal predetermined number of generic logic gates and a substantially equal number of synchronous circuits;
a logic simulator to simulate a selected subset of the plurality of partitions to determine input signal activity of substantially all inputs to each generic logic gate therein;
a mapper to map the generic logic gates in each selected partition into mapped logic gates of a technology library to accurately determine the power consumption of each selected partition;
a power estimator coupled to the partitioner, the logic simulator, and the mapper, the power estimator to determine an average power correction ratio for the integrated circuit design, the power estimator further to generate a gross power consumption estimate of the integrated circuit design, and the power estimator further to generate a reasonably accurate power consumption estimate of the integrated circuit design without full synthesis thereof by correcting the gross power consumption estimate with the average power correction ratio.

21. The system of claim 20, wherein
the partitioner, the logic simulator, and the power estimator are implemented by machine readable instructions, and
the system further comprises
a processor to execute the machine readable instructions, and
a storage device coupled to the processor, the storage device to store the machine readable instructions implementing the partitioner, the logic simulator, and the power estimator.

22. The system of claim 20, wherein
the power estimator determines the average power correction ratio for the integrated circuit design by averaging ratios of accurate power estimates of the selected partitions in response to calculated power consumption of each mapped logic gate therein to gross power estimates of the selected partitions in response to simple power consumption estimates of each generic logic gate therein.

23. The system of claim 22, further comprising:
a timing analyzer to identify one or more potential critical data paths in the selected partitions; and
wherein the power estimator generates the accurate power estimate and determines the average power correction ratio in further response to the generic logic gates within the one or more potential critical data paths in the selected partitions.

* * * * *